United States Patent
Miyazawa et al.

(12) 
(10) Patent No.: US 6,383,270 B1
(45) Date of Patent: May 7, 2002

(54) FILM-FORMING COMPOSITION AND PROCESS FOR ITS PRODUCTION

(75) Inventors: Shin Miyazawa, Suwa; Yuichi Morihira, Okaya; Hideo Fujimori, Chino, all of (JP)

(73) Assignees: N.T.S. Corporation, Nagano; Ryowa Corporation, Osaka, both of (JP)

( * ) Notice: Subject to any disclaimer, the term of this patent is extended or adjusted under 35 U.S.C. 154(b) by 0 days.

(21) Appl. No.: 09/573,090

(22) Filed: May 17, 2000

(30) Foreign Application Priority Data

Jul. 14, 1999 (JP) .......................... 11-200850

(51) Int. Cl.7 ................................. C09D 1/00
(52) U.S. Cl. .................. 106/2; 106/286.2; 106/287.17; 106/287.34
(58) Field of Search ................. 106/287.17, 287.34, 106/2, 286.2

(56) References Cited

U.S. PATENT DOCUMENTS 4,761,188 A  * 8/1988 Miyata ................... 148/6.2
5,561,454 A  * 10/1996 Kurabayashi et al. ....... 347/105

FOREIGN PATENT DOCUMENTS

| EP | 0 282 619 A | | 9/1988 |
|---|---|---|---|
| EP | 0 884 288 A | | 12/1998 |
| JP | 59166568 A | * | 9/1984 |
| JP | 59 166568 A | | 1/1985 |
| JP | 3258861 A | * | 11/1991 |
| JP | 7102497 A | * | 4/1995 |
| JP | 9002976 A | * | 1/1997 |
| WO | WO 92 10552 A | | 6/1992 |
| WO | WO-92/10552 | * | 6/1992 |

OTHER PUBLICATIONS

Derwent abstract for WO 92/10552.*

* cited by examiner

*Primary Examiner*—C. Melissa Koslow
(74) *Attorney, Agent, or Firm*—Cook, Alex, McFarron, Manzo, Cummings & Mehler, Ltd.

(57) ABSTRACT

A hydrotalcite-type compound $[M^{2+}_{1-x}M^{3+}_x(OH)_2]^{x+}[A^{n-}_{x/n}mH_2O]^{x-}$ (where $M^{2+}$ is a bivalent metal ion, $M^{3+}$ is a trivalent metal ion, $A^{n-}$ is an anion of valency n and $0<x\leq0.33$) is mixed with a binder such as colloidal silica to obtain a film-forming composition. The film-forming composition can form strong coatings that exhibit hydrophilic properties. The hydrotalcite-type compound can disperse in water under acidic conditions, thus allowing its mixture with the binder. Once the hydrotalcite-type compound is dispersed with the acid, it can then be diluted with water or an alcohol. This makes it possible to obtain coatings containing titanium oxide, etc., that constantly exhibit hydrophilic properties with or without light irradiation.

11 Claims, No Drawings

FILM-FORMING COMPOSITION AND PROCESS FOR ITS PRODUCTION

TECHNICAL FIELD

The present invention relates to a film-forming composition and to a process for its production, and particularly relates to a composition for formation of hydrophilic films.

BACKGROUND ART

Coating solutions have conventionally been prepared to form various different coatings for protection of surfaces of a variety of articles. The coatings produced by these coating solutions include hydrophilic coatings and water-repellent coatings. Both hydrophilic coatings and water-repellent (hydrophobic) coatings are effective for surface protection and antifouling effects. Water-repellent resin coating films and the like have been widely used in the prior art. However, hydrophilic coatings are effective in avoiding blockage of visibility on window glass or mirrors, or in preventing adhesion of oily contaminants that are abundant in metropolitan regions. Formation of hydrophilic coatings has therefore become more desired in recent years.

Some of these coatings include photocatalysts such as titanium oxides. When irradiated with light, the photocatalysts in photocatalyst-containing coatings decompose organic substances. Such coatings, therefore, are often used for coating of a variety of familiar articles for the purpose of providing the articles with antibacterial properties, preventing adhesion of organic substances on air conditioner evaporators, and the like. A photocatalyst-containing coating of this type will normally exhibit hydrophobic properties when not irradiated with light, due to the photocatalyst itself or to alkyl groups present in the coating with the photocatalyst. When the coating is irradiated with light, however, the photocatalyst effect causes adsorption of hydroxyl groups onto the surface from moisture in the air, causing the coating to exhibit hydrophilic properties.

Furthermore, such hydrophilic coatings have low adhesive force on substrate surfaces and low surface hardness. Consequently, rubbing causes the coatings to easily peel from the substrate surfaces on which they are formed. Attempts to increase the peeling strength of the coatings usually require burning and other such steps, and therefore it has been difficult to form coatings that can be coated with simple procedures such as spraying and drying, and that exhibit strong adhesive force and high hardness.

Some photocatalyst-containing coatings exhibit hydrophilic properties when irradiated with light. However, as time passes in the absence of light irradiation, the surface hydrophilic groups are lost and hydrophobic properties are exhibited that result in adhesion of water droplets during nighttime, thereby promoting adhesion of dirt and making it impossible to adequately exhibit the antifouling effect of the photocatalyst, once such dirt has adhered.

Even coatings with hydrophilic groups on the surface usually have contact angles of about 50° for water and therefore cannot be said to have sufficient wettability, and since water droplets readily form when water adheres to the surface, a problem has existed in that it has not been possible to exhibit an adequate antifouling effect by hydrophilic groups.

It is an object of the present invention to overcome these problems by providing a film-forming composition that can form strong coatings that exhibit hydrophilic properties. It is another object to provide coatings with sufficient hydrophilic properties or electronic properties to prevent adhesion of dirt or dust.

SUMMARY OF THE INVENTION

In order to solve the aforementioned problem, the film-forming composition of the invention comprises a liquid containing a binder and a hydrotalcite-type compound represented by $[M^{2+}_{1-x}M^{3+}_x(OH)_2]^{x+}[A^{n-}_{x/n} \cdot mH_2O]^{x-}$ (where $M_{2+}$ is a bivalent metal ion, $M^{3+}$ is a trivalent metal ion, $A^{n-}$ is an anion of valency n and $0<x\leq0.33$). The composition may be coated and dried to form a coating that exhibits hydrophilic properties. The coating is resistant to smearing, and can be provided with sufficient hardness to withstand a normal living environment.

The composition preferably contains transition metal oxide particles, preferably titanium oxide particles. Inclusion of transition metal oxide particles makes amount of adherent dirt or dust to coatings decrease extremely and hardness of coatings increase. Furthermore, inclusion of titanium oxide particles has also been confirmed to improve the wettability of formed coatings, impart antibacterial properties and cause oxidation reaction on $SO_x$ and $NO_x$.

The mean particle size of the hydrotalcite-type compound is 3–500 μm, and it also preferably includes fine particles of a stable inorganic compound, having a mean particle size of 1 μm or smaller. This will increase the smoothness of the coating surface and reduce the contact angle for water and the like, thus providing improved wettability and reducing the degree of fouling of the coating surface. The mean particle size of the inorganic compound is preferably 0.001–0.5 μm, and even more preferably 0.01–0.1 μm. If the mean particle size exceeds 1 μm, the effect of improved wettability will be reduced, while the catalyst performance per unit weight is also thought to be inferior. On the other hand, it is very difficult to form fine particles with a mean particle size of smaller than 0.001 μm, and this will increase production cost and reduce the effect of improved smoothness of the coating surface.

The inorganic compound is preferably a transition metal oxide. Transition metal oxides can be easily formed into fine particles of 1 μm or smaller by chemical synthesis or the like. And dirt and dust hardly adheres to the coatings by inclusion of transition metal oxide particles to the film-forming composition (coating liquid or solution) while also increasing the coating hardness; by using substances with catalytic functions that decompose organic matter (such as titanium oxides) as the transition metal oxide it is possible to improve the antifouling property of the coating, while using water-absorbing substances (such as magnesium oxides and aluminum oxides) can improve the hydrophilic property and wettability.

Transition metal oxide particles in the coating film are covered with the hydrotalcite-type compound, therefore surface region of the coating film becomes N-type semiconductor and it becomes hardly charged with electricity. Then, anti-pollution property is obtained, i.e. it is preventable from adhesion of dirt or dust to the coating film. The coating films formed by using the film-forming composition (coating liquid or solution) of this invention have electronic properties of the semiconductor which has surface electric resistivity (specific resistance) of $10^8$–$10^{13}$ Ω cm. For example, when dust charged with electricity is applied on the coating film, dust become unbalance in electricity and easily drop out of the surface of the coating film without adhering to the surface thereof.

Here, it is preferred for the transition metal oxide to be a substance that is stable in normal environments, and typical examples that may be used include titanium oxides (TiO, $Ti_2O_3$, $TiO_2$), manganese oxides (MnO, $Mn_2O_3$, $MnO_2$, $Mn_3O_4$, $Mn_2O_7$) andiron oxides (FeO, $Fe_2O_3$, $Fe_3O_4$). Other stable transition metal oxides that exist include oxides of Sc, V, Cr, Co, Ni, Cu, Zn, Y, Zr, Nb, Mo, Tc, Ru, Rh, Pd, Ag, Cd, Ef, Ta, W, Re, Os, Ir, Pt, Au and Hg. These can provide the coating itself with antibacterial properties and absorption or catalytic action on $NO_x$ and $SO_x$.

It is preferred for at least a portion of the transition metal oxide to be titanium oxide. The titanium oxide particles may have any desired shape. The mean particle size of the titanium oxide is 1 μm or smaller, preferably 0.001–0.5 μm, and more preferably 0.01–0.1 μm.

The hydrotalcite-type compound preferably contains $Mg^{2+}$ as $M^{2+}$, $Al^{3+}$ as $M^{3+}$ and $CO_3^{3-}$ as $A^{n-}$. Magnesium-aluminum-hydroxide-carbonate hydrates are substances with high stability among hydrotalcite-type compounds, and are easily obtainable. Here, x=0.33, n=2 and m=4 is most preferred.

The binder is preferably colloidal silica. The binder is preferably an inorganic binder, and colloidal silica is most preferred from the viewpoint of composition stability, coating adhesion, transparency of the coating film, etc.

For the means described above, the liquid (the film-forming composition) preferably contains water, solvents comprising a mixture of water and an alcohol, or other organic solvents. Dilution with a solvent comprising water or alcohol can be used to adjust the transparency of the coating and the pH, hardness and volatility of the composition.

The preferred process for production of the aforementioned film-forming composition is one wherein a hydrotalcite-type compound represented by $[M^{2+}_{1-x}M^{3+}_x(OH)_2]^{x+}[A^{n-}_{x/n} \cdot mH_2O]^{x-}$ (where $M^{2+}$ is a bivalent metal ion, $M^{3+}$ is a trivalent metal ion, $A^{n-}$ is an anion of valency n and $0 < x \leq 0.33$) is dispersed in water under acidic conditions and then mixed with the binder. Dispersing the hydrotalcite-type compound in the solvent including water under acidic conditions and mixing it with the binder at a same time or one after another will facilitate dispersion of the hydrotalcite-type compound, yielding a film-forming composition that avoids aggregation of the hydrotalcite-type compound while allowing formation of a highly transparent coating.

Here, the inorganic compound (transition metal oxide) particles may be added the hydrotalcite-type compounds under acidic conditions. In this case, the inorganic compound particles may be mixed before, at a same time, and after the hydrotalcite-type compound is mixed with the solvent including water or both of water and binder. It is particularly preferred for the inorganic compound combined with the binder to be mixed in the hydrotalcite-type compounds dispersion (slurry).

After mixing the hydrotalcite-type compound and the binder, the mixture is preferably diluted with water and/or an alcohol. Dilution with water or alcohol after mixing can be used to adjust the transparency of the coating and the pH, hardness and volatility of the composition, thus allowing appropriate adjustment to match the properties and purpose of the substrate on which the coating is to be formed. Here, the solvent for dilution may be organic solvent.

For the means described above, the liquid preferably contains the hydrotalcite-type compound of 5 ppm to 1 wt %. By setting the hydrotalcite-type compound concentration within this range it is possible to obtain a coating with hydrophilic properties while minimizing aggregation of the liquid.

EMBODIMENTS OF THE INVENTION

Embodiments of the invention will now be explained in detail. For the invention, attention was focused on substances represented by the following formula, which are known as hydrotalcite-type compounds.

$$[M^{2+}_{1-x}M^{3+}_x(OH)_2]^{x+}[A^{n-}_{x/n} \cdot mH_2O]^{x-} \quad (1)$$

Here, $M^{2+}$ is a bivalent metal ion such as $Mg^{2+}$, $Mn^{2+}$, $Fe^{2+}$, $Co^{2+}$, $Ni^{2+}$, $Cu^{2+}$ or $Zn^{2+}$, $M^{3+}$ is a trivalent metal ion such as $Al^{3+}$, $Fe^{3+}$, $Cr^{3+}$, $Co^{3+}$ or $In^{3+}$, and An- is an anion of valency n such as $OH^-$, $F^-$, $Cl^-$, $Br^-$, $NO_2^-$, $CO_3^{2-}$, $SO_4^{2-}$, $Fe(CN)_3^{3-}$, $CH_3COO^-$, oxalate ion or salicylate ion. x is an value such that $0 < x \leq 0.33$.

These hydrotalcite-type compounds have a layered structure with alternate stacking of a base layer represented by $[M^{2+}_{1-x}M^{3+}_x(OH)_2]^{x+}$ and an intermediate layer represented by $[A^{n-}_{x/n} \cdot mH_2O]^{x-}$. In the base layer, $M^{2+}$ may be substituted with $M^{3+}$ to a maximum molar ratio of $M^{2+}:M^{3+}=2:1$, and a larger value for x, indicating the degree of substitution, will result in a higher charge for the base layer; the charge is neutralized by $A^{n-}$ in the intermediate layer, and the remaining space of the intermediate layer is filled with $H_2O$ (water of crystallization).

Hydrotalcite-type compounds have anion-exchange properties, and their other properties as antacids (neutralizing agents), aggregating agents, moisture absorbers, anion-absorbers, etc., are known in the prior art.

The present invention provides a film-forming composition by combination of the aforementioned hydrotalcite-type compound with a binder. Here, the hydrotalcite-type compound may be dissolved in water in the presence of an acid before its mixture with the binder. Once the hydrotalcite-type compound has been dissolved or dispersed in water and the binder mixed therewith, it may be further diluted with water or an alcohol.

The binder used may be an inorganic binder such as silica (silicic acid) or an organic binder such as an acrylate resin, and the use of colloidal silica in particular can give a film-forming composition with long-term stability since colloidal silica will readily bond with the hydrotalcite-type compound. Water or an alcohol, organic solvents, or a mixture thereof, may be used as a diluting solvent after preparation of the stock solution. However, it is preferred to use one or more types of alcohols selected from among alcohols such as methanol, ethanol, isopropyl alcohol and the like, to increase the stability and dryability of the coating solution.

Stable substances among hydrotalcite-type compounds include those having the collective chemical name of magnesium-aluminum-hydroxide-carbonate hydrates $(Mg_6Al_2(OH)_{16}CO_3 \cdot 4H_2O)$ (hereunder referred to simply as "hydrotalcite-type compound A"). Specifically, these include the powder product DHT-6 (trademark of Kyowa Chemical Industry Co., Ltd.) with a mean particle size of about 3 μm; the polycrystalline particles Kyoward 100, Kyoward 200, Kyoward 300, Kyoward 400, Kyoward 500PL, Kyoward 500SH, Kyoward 500SN, Kyoward 1000 and Kyoward 2000 (all trademarks of Kyowa Chemical Industry Co., Ltd.) with a mean particle size of about 20–300 μm, and the amorphous products Kyoward 600 and Kyoward 700 with a mean particle size of about 20–300 μm. These forms of hydrotalcite-type compound A have anion substitutability so that the carbonic acid groups in it are substituted by other anions. The mixture of the hydrotalcite-type compound and binder may be carried out under neutral or acidic, but preferably acidic, conditions. When they are mixed under alkali conditions, the properties of the hydrotalcite-type compound promote aggregation, thus hampering the performance of the coating solution. An acidic liquid containing the binder may be used to control the acidity of the coating solution, or an acid may be added separately during mixing to maintain the acidity of it.

Primer A (trademark of Colcoat Co.) and Ceramate (trademark of shokubai kasei Co.) are products containing colloidal silica which is most preferred as the inorganic binder. Primer A is a silica dispersion containing colloidal silica and also containing primarily isopropyl alcohol as the solvent.

EXAMPLE 1

Concrete examples of the above-mentioned film-forming composition will now be explained. Hydrotalcite-type compound A (powdered) was added at 0.01–0.05 g to 1 liter of distilled water and stirred therewith, and then a silica dispersion containing a 2–3 wt % of colloidal silica with a solvent composed mainly of isopropyl alcohol was added and mixed with the dispersion, to obtain coating solution B. The dispersion with which the hydrotalcite-type compound A was mixed was at pH 6.5 when the hydrotalcite-type compound A was added at 0.01 g, and at pH 7.3 when it was added at 0.02 g. The silica dispersion was at pH 4.6. Hydrotalcite-type compound A essentially does not disperse in distilled water. However, the silica dispersion which is mixed after adding hydrotalcite-type compound A is neutral, and thus the mixture with the silica dispersion allows the already added hydrotalcite-type compound A to disperse in the liquid.

TABLE 1

| | Hydro-talcite A (g) | Silica solution (ml) | Aqueous solution (ml) | D | E | F | G |
|---|---|---|---|---|---|---|---|
| ① | 0.01 | 20 | 5 | X | X | X | X |
| ② | 0.01 | 20 | 10 | X | X | X | X |
| ③ | 0.01 | 20 | 15 | X | X | X | X |
| ④ | 0.01 | 20 | 20 | Δ | Δ | Δ | Δ |
| ⑤ | 0.01 | 20 | 25 | Δ | Δ | Δ | Δ |
| ⑥ | 0.01 | 20 | 30 | Δ | Δ | Δ | Δ |
| ⑦ | 0.01 | 20 | 35 | Δ | Δ | Δ | Δ |
| ⑧ | 0.01 | 20 | 40 | Δ | Δ | Δ | Δ |
| ⑨ | 0.01 | 20 | 45 | ○ | ○ | ○ | ○ |
| ⑩ | 0.01 | 20 | 50 | ○ | ○ | ○ | ○ |
| ⑪ | 0.02 | 20 | 5 | ○ | ○ | ○ | ○ |
| ⑫ | 0.02 | 20 | 10 | ○ | ○ | ○ | ○ |
| ⑬ | 0.02 | 20 | 15 | ○ | ○ | ○ | ○ |
| ⑭ | 0.02 | 20 | 20 | ⊙ | ⊙ | ⊙ | ⊙ |
| ⑮ | 0.02 | 20 | 25 | ○ | ○ | ○ | ○ |
| ⑯ | 0.02 | 20 | 30 | ○ | ○ | ○ | ○ |
| ⑰ | 0.02 | 20 | 35 | ○ | ○ | ○ | ○ |
| ⑱ | 0.02 | 20 | 40 | ○ | ○ | ○ | ○ |
| ⑲ | 0.02 | 20 | 45 | ○ | ○ | ○ | ○ |
| ⑳ | 0.02 | 20 | 50 | ○ | ○ | ○ | ○ |

In Table 1, "X" indicates that no hydrophilic properties were observed, "Δ" indicates that hydrophilic properties were observed but that they were insufficient, "O" indicates that hydrophilic properties were obtained and "⊙" indicates that the hydrophilic properties were very satisfactory. As shown in Table 1, sufficient hydrophilic properties were not obtained when then hydrotalcite-type compound A weight was less than 5 ppm, but hydrophilic properties were obtained at 5 ppm and greater, and particularly good hydrophilic properties were obtained at about 12 ppm and greater. On the other hand, while not shown in Table 1, when the hydrotalcite-type compound A is at a weight of about 0.2 wt % or greater, precipitates begin to be formed in the dispersion, and at greater than 1 wt % gelling occurs rendering the film-forming composition unsuitable. Thus, the weight of the hydrotalcite-type compound A is preferably in the range of 5 ppm to 1 wt %, and more preferably from 10 ppm to 0.2 wt %.

After then adding 0.05 g of the hydrotalcite-type compound A to 1 liter of distilled water and stirring, a specified amount of the dispersion (pH=7.5) was separated and combined with a diluted mixture of the same silica dispersion as above (pH=4.6) and distilled water in equal amounts each, to prepare coating solution C. Coating solution C was coated onto the same 4 types of substrate surfaces mentioned above, and after drying the hydrophilic properties of the surfaces were examined. The results are shown in Table 2.

TABLE 2

| | Hydro-talcite A (g) | Silica solution (ml) | Aqueous solution (ml) | D | E | F | G |
|---|---|---|---|---|---|---|---|
| ① | 0.05 | *20 | 5 | X | X | X | X |
| ② | 0.05 | *20 | 10 | Δ | Δ | Δ | Δ |
| ③ | 0.05 | *20 | 15 | Δ | Δ | Δ | Δ |
| ④ | 0.05 | *20 | 20 | Δ | Δ | Δ | Δ |
| ⑤ | #0.05 | *20 | 5 | Δ | Δ | Δ | Δ |
| ⑥ | #0.05 | *20 | 10 | ○ | ○ | ○ | ○ |
| ⑦ | #0.05 | *20 | 15 | ⊙ | ⊙ | ⊙ | ⊙ |
| ⑧ | #0.05 | *20 | 20 | Δ | Δ | Δ | Δ |

The first four samples shown in Table 2 were measured with different mixing ratios, and the remaining four samples were further diluted by mixing 10 ml of industrial ethanol after formation in the same manner as the first four. The "*" symbols in the colloidal silica column in Table 2 indicate those diluted with distilled water. That is, the 20 ml in Table 2 includes the same silica amount as the 10 ml in Table 1. The "#" symbols in the left column of Table 2 indicate that the coating solutions were finally diluted with 10 ml of ethanol.

After then adding 0.02 g of the hydrotalcite-type compound A to 1 liter of distilled water and stirring (pH=7.3), a specified amount of the dispersion was separated and the same silica dispersion as above (pH=4.6), an equal amount of distilled water, and 1 ml of a 0.1 mole/liter $HNO_3$ aqueous solution were added to each sample and stirred therewith. Coating solution H prepared in this manner was coated onto the same 4 types of substrate surfaces mentioned above, and their hydrophilic properties were examined. The results are shown in Table 3. The "*" symbols in Table 3 indicate those diluted with an equal amount of distilled water, as above Table 2, and the "#" symbols in the left column indicate that the samples were finally diluted with 10 ml of industrial ethanol, as above Table 2.

TABLE 3

| | Hydro-talcite A (g) | Silica solution (ml) | Aqueous solution (ml) | Acid (ml) | D | E | F | G |
|---|---|---|---|---|---|---|---|---|
| ① | 0.02 | *20 | 1 | 1 | X | X | X | X |
| ② | 0.02 | *20 | 2 | 1 | Δ | Δ | Δ | Δ |
| ③ | 0.02 | *20 | 3 | 1 | Δ | Δ | Δ | Δ |
| ④ | 0.02 | *20 | 4 | 1 | Δ | Δ | Δ | Δ |
| ⑤ | 0.02 | *20 | 5 | 1 | ○ | ○ | ○ | ○ |
| ⑥ | 0.02 | *20 | 6 | 1 | ○ | ○ | ○ | ○ |
| ⑦ | 0.02 | *20 | 7 | 1 | Δ | Δ | Δ | Δ |
| ⑧ | #0.02 | *20 | 1 | 1 | X | X | X | X |
| ⑨ | #0.02 | *20 | 2 | 1 | Δ | Δ | Δ | Δ |
| ⑩ | #0.02 | *20 | 3 | 1 | Δ | Δ | Δ | Δ |

TABLE 3-continued

| | Hydro-talcite A (g) | Silica solution (ml) | Aqueous solution (ml) | Acid (ml) | Substrate D | E | F | G |
|---|---|---|---|---|---|---|---|---|
| ⑪ | #0.02 | *20 | 4 | 1 | Δ | Δ | Δ | Δ |
| ⑫ | #0.02 | *20 | 5 | 1 | ○ | ○ | ○ | ○ |
| ⑬ | #0.02 | *20 | 6 | 1 | Δ | Δ | Δ | Δ |
| ⑭ | #0.02 | *20 | 7 | 1 | Δ | Δ | Δ | Δ |

The hydrotalcite-type compound A used in the above example consists of crystalline particles such as DHT-6, Kyoward 100, 200, 300, 400, 500, 1000 or 2000, but using only Kyoward 600 or 700 composed of amorphous particles or using them as an admixture with one of the above-mentioned products composed of crystalline particles can increase the antibacterial property while also exhibiting an effect of absorbing harmful gases such as $NO_x$ and $SO_x$.

Embodiments of coating solutions containing titanium oxide will now be explained. The hydrotalcite-type compounds mentioned above were also used in these coating solutions, which were prepared by mixing titanium oxide particles and a binder therewith. The hydrotalcite-type compounds were exactly the same as in the coating solutions described above, and as an example, hydrotalcite-type compound A may be used. The inorganic compound (transition metal oxide) mixed therewith is most preferably titanium oxide particles, and especially a titanium oxide slurry solution. But zirconium oxide, zinc oxide, strontium titanate, tin oxide, tungsten oxide, iron oxide, bismuth oxide and the like may also be used in addition to titanium oxide. The binder is preferably an inorganic binder such as colloidal silica or colloidal titania, with colloidal silica being most preferred. Photocatalyst coating solutions X containing titanium oxide and binders are also commercially available, and such photocatalyst coating solutions X may also be used instead of titanium oxide particles and the binder. Specific examples of photocatalyst coating solutions X include ST-K03 and ST-K01 (both trademarks or product numbers of Ishihara Industries).

Inorganic compounds with a mean particle size of 1 μm or smaller, which is smaller than the particle size of the hydrotalcite-type compound, including titanium oxide, zirconium oxide, zinc oxide, strontium titanate, tin oxide, tungsten oxide, iron oxide and bismuth oxide mentioned above, as well as silica and other silicon oxides which also function as binders, and the transition metal oxides zirconia, alumina, amorphous titanium oxide, magnesia, manganese oxide, nickel oxide, chromium oxide, copper oxide, cobalt oxide, vanadium oxide, ruthenium oxide and strontium oxide. Stable transition metal oxides (i.e. which do not undergo chemical deterioration in normal environments) are especially preferred because they provide high resistance to dirtiness, pollution, or contamination and high coating hardness. The mean particle size is preferably in the range of 0.001–0.5 μm, and a mean particle size of 0.01–0.1 μm is more preferable still. The above-mentioned titanium oxide and colloidal silica mixture slurry solutions ST-K03 and ST-K01 contain fine titanium oxide particles with a particle size distribution of about 0.001–0.5 μm.

Because hydrocarbon groups are situated in the gaps between the $M^{2+}$ (for example, $Mg^{2+}$) ions and $M^{3+}$ (for example, $Al^{3+}$) ions in the hydrotalcite-type compound situated on the coating surface, these sections exhibit hydrophobic properties. Consequently, it is sometimes impossible to achieve sufficient wettability despite the hydrophilic surface formed as the overall coating. Also, since the particle size of the hydrotalcite-type compound is from a few dozen to a few hundred micrometers on average as mentioned above and the particle size distribution is also relatively coarse at about a few micrometers at the smallest, irregularities are formed on the coating surface due to the particle sizes of the hydrotalcite-type compound, which is believed to be the reason for the overall larger contact angle for water and the like on the coating surface. However, since the inorganic compound has a mean particle size of 1 μm or smaller, preferably 0.001–0.5 μm and more preferably 0.01–0.1 μm, when the film-forming composition is coated and hardened these become positioned to cover the gaps between the hydrotalcite-type compound particles and between the $M^{2+}$ ions, thus smoothing the coating surface and providing an apparent improvement in wettability even though the hydrophilic property of the coating itself does not change, and it is thought that this further reduces the contact angle for water, for example.

Since aluminum oxide (alumina) and magnesium oxide (magnesia) have particularly strong moisture absorption (water absorption) properties, it is thought that they tend to incorporate moisture in the atmosphere into the coating surface, resulting in the especially notable effect of improved wettability. And in the coating films formed by application of the coating liquid or solution (film-forming composition), which is made by way of mixing all transition metal oxide particles including titanium oxide and others as well as above aluminum oxide and magnesium oxide with the hydrotalcite-type compounds under acidic condition, the transition metal oxide particles are covered with the hydrotalcite-type compounds and then, the surface of the coating films have the electronic properties of semiconductor. Because this effect is usually accompanied by an effect of reduced electrostatic charge property on the coating surface and causes the electric balance of dust charged with electricity to lose when dust is applied on the coating surface, it is thought to exhibit an effect of minimizing (or not promoting) adhesion of dirt due to static electricity (particularly carbon in automobile exhaust gas and other combustion products present in the atmosphere).

Control experiments conducted by the present inventors (experiments comparing cases with and without formation of coatings on substrate surfaces) have confirmed that high antifouling properties of the coatings are exhibited even in locations with high concentrations of exhaust gas and the like, so that an effect is exhibited of maintaining the cleanliness of the coating surfaces; it is surmised that, as a result, when a hydrotalcite-type compound is combined with a transition metal oxide to prepare a film-forming composition, the adsorption properties of the hydrotalcite-type compound and the catalytic activity of the transitional metal oxide cause adsorption of various substances from the atmosphere, and produce a reaction that oxidizes them.

EXAMPLE 2

A titanium oxide coating solution X (ST-K03 or ST-K01) containing titanium oxide was added as a slurry solution to hydrotalcite-type compound A and mixed to prepare stock solution I. The coating solution X had a solid concentration of 10%, a titanium oxide and inorganic binder (colloidal silica) weight ratio of 50:50, a pH of 1.5 by addition of nitric acid, a solvent of alcohol and water, and a viscosity of 1–3 cps. The pH and state of dissolution of stock solutions I were observed after a plurality of the stock solutions I were formed by changing the weight of the hydrotalcite-type compound A and the volume of the coating solution X and stirred. The results are shown in Table 4.

TABLE 4

Stock solution I

| | Photocatalyst coating solution (ml) | Hydro-talcite A (g) | pH | State of dissolution | Hydrophilic properties |
|---|---|---|---|---|---|
| ① | 99.99 | 0.01 | 1.0 | totally | ○ |
| ② | 99.97 | 0.03 | 1.2 | totally | ○ |
| ③ | 99.95 | 0.05 | 1.4 | essentially | ⊚ |
| ④ | 99.92 | 0.08 | 1.4 | essentially | ⊚ |
| ⑤ | 99.90 | 0.10 | 1.6 | essentially | ⊚ |
| ⑥ | 99.80 | 0.20 | 1.7 | slight precipitate remain | ○ |
| ⑦ | 99.60 | 0.40 | 1.9 | slight precipitate remain | ○ |
| ⑧ | 99.40 | 0.60 | 2.3 | precipitate to gel | ○ |
| ⑨ | 99.00 | 1.00 | 4.5 | gelling | ○ |

Table 4 suggests that the hydrotalcite-type compound A had dissolved with the nitric acid in the coating solution X in samples (1) and (2). There was also no impairment of the hydrophilic properties, and the coating had sufficient transparency. In the three samples of (3) through (5) there was virtually no precipitation, and hydrophilic properties were obtained. In the samples of (6) and (7), aggregation occurred two hours after mixing. The final pH was 4.6. When these samples (1)–(7) were diluted with water and/or alcohol after mixing and before aggregation, aggregation no longer occurred and stabilization was achieved in a pH range of 2–4. In both of the last two samples of (8) and (9) aggregation occurred within a short time. However, the samples can be released from the aggregated state by way of exertion of ultrasonic vibration after addition of fatty acid, nitric acid, hydrochloric acid, etc. into these aggregated samples. Whereas, the concentration therefore cannot be adjusted by dilution, etc., but actual formation of a hydrophilic coating is possible by coating the aggregated samples in a gelled state and drying.

Table 5 shows the results for coating solution J that was prepared by adding alcohol to dilute stock solution I prepared under the conditions of (5) in Table 4. Hydrophilic properties are still exhibited even when stock solution I was diluted to about 100-fold. The hardness of the coating increases if the amount of colloidal silica as the inorganic binder is increased. Because stock solution I is strongly acidic, the coating solution J with the pH raised to about 3–5 by dilution, as shown in Table 5 is usually coated. The pH after dilution is adjusted to match the properties of the substrate to be coated. Dilution improves the transparency of coatings formed using the coating solution J.

TABLE 5

Solution J

| | Stock Solution (ml) | Ethanol (ml) | Hydrophilic properties | Condition |
|---|---|---|---|---|
| ① | 1 | 99 | Δ | hydrophobic but improvable |
| ② | 5 | 95 | ○ | somewhat low hardness |
| ③ | 10 | 90 | ⊚ | satisfactory transparency |
| ④ | 20 | 80 | ⊚ | good transparency |
| ⑤ | 30 | 70 | ⊚ | good transparency |
| ⑥ | 40 | 60 | ⊚ | good transparency |
| ⑦ | 50 | 50 | ⊚ | low transparency |

TABLE 5-continued

Solution J

| | Stock Solution (ml) | Ethanol (ml) | Hydrophilic properties | Condition |
|---|---|---|---|---|
| ⑧ | 60 | 40 | ⊚ | low transparency |
| ⑨ | 70 | 30 | ⊚ | low transparency |
| ⑩ | 80 | 20 | ⊚ | somewhat rough appearance |
| ⑪ | 90 | 10 | ⊚ | somewhat rough appearance |

Coating solutions B, C and J prepared in the manner described above can be coated by a variety of different methods including dipping, hand coating, spraying and spin coating, and after coating they may be dried at normal temperature for 24 hours, or forcefully dried at a temperature of about 100–200° C. When applied onto a glass plate, aluminum sheet, iron sheet, thermoplastics (acrylic resin, polyethylene resin, etc.), thermosetting resin (phenol resin, epoxy resin, etc.), polycarbonate resin, etc., to form coatings they exhibit firm adhesion, and are virtually impossible to remove by wiping with a cloth or the like. All the coatings with satisfactory hydrophilic properties on each substrate had water contact angles of 15° or smaller. After coating solution J was applied to form coatings on all substrates and then the coatings were stood for 150 hours in a dark room, the hydrophilic properties of the coatings were measured in that state. The hydrophilic properties of the coatings were adequately maintained. All of the coating solutions of this embodiment allow formation of hydrophilic coatings, and will readily form non-peeling, anti-clouding coatings on the surfaces of window glass and mirrors of automobiles, architectural structures and the like. They also prevent adhesion of organic substances. In addition, when applied onto bath tiles, toilets and the like, they can inhibit proliferation of mold and saprophytic bacteria, yellowing due to adhesion of organic substances, etc. Since they maintain their hydrophilic properties during the night, they can also prevent fouling due to water droplet adhesion.

The hydrotalcite-type compound A used in Example 2 above consists crystalline particles such as DHT-6, Kyoward 100, 200, 300, 400, 500, 1000 or 2000. But by using Kyoward 600 or 700 composed of amorphous particles, as an admixture with one of the above-mentioned products composed of crystalline pamicles, an effect can be exhibited of absorbing harmful gases such as $NO_x$, and $SO_x$.

In the coatings formed in Example 2 the water contact angles were only about 8–30°, and therefore a major improvement trend in the wettability of the coating surfaces was exhibited, compared to the coating formed in Example 1 that had contact angles of generally 30–50°. This wettability deteriorated by only about 5 % even after the coating surfaces were immersed in purified water for 168 hours, thus confirming adequate stability. In all of the above examples, an aseptization rate of 99% or greater was obtained in all cases according to the film contact method (an antibacterial test (using yellow staphylococcus, with a transfer of $2.2 \times 10^6$ cells) conducted according to the "Independent Standards and Antibacterial Test for Silver and Other Inorganic Antibacterial Agents" of the "Society of Silver and Other Inorganic Antibacterial Agents"). Particularly high antibacterial properties and satisfactory oxidation reaction of $SO_x$ and $NO_x$ was exhibited when the amorphous types Kyoward 600 and 700 were used with crystalline hydrotalcite-type compound in equal amounts (1:1).

Next, as the above example 2, the coating solution X was added to hydrotalcite-type compound A and mixed to prepare stock solution K, which is same as the above solution I. The stock solution K was applied on a substrate and dried to form a coating film. The electric resistivity of surface of the coating film was measured. The substrate is made of polycarbonate resin, which is $10^{15}$–$10^{16}$ Ω cm in surface resistivity. The measuring instruments are high resistance meter 4339B and resistivity cell 16008B (product names of Hewlett-Packard Co.). The results are indicated in Table 6.

TABLE 6

Solution K

| | Hydrotalcite (wt %) | pH | Surface resistivity (Ωcm) | Resistance to pollution |
|---|---|---|---|---|
| ① | 0.0001 | 0.5 | $10^{14}$–$10^{15}$ | Δ |
| ② | 0.001 | 0.5 | $10^{13}$–$10^{14}$ | ○ |
| ③ | 0.004 | 0.5 | $10^{13}$–$10^{14}$ | ○ |
| ④ | 0.005 | 0.5 | $10^{12}$ | ⊙ |
| ⑤ | 0.007 | 0.5 | $10^{12}$ | ⊙ |
| ⑥ | 0.01 | 1.0 | $10^{12}$ | ⊙ |
| ⑦ | 0.03 | 1.0 | $10^{12}$ | ⊙ |
| ⑧ | 0.05 | 1.5 | $10^{12}$–$10^{13}$ | ⊙ |
| ⑨ | 0.08 | 2.0 | $10^{12}$–$10^{13}$ | ⊙ |
| ⑩ | 0.1 | 2.5 | $10^{12}$–$10^{13}$ | ⊙ |
| ⑪ | 1.0 | 5.0 | $10^{13}$–$10^{14}$ | ○ |
| ⑫ | 2.0 | 5.5 | $10^{13}$–$10^{14}$ | ○ |
| ⑬ | 3.0 | 5.9 | $10^{13}$–$10^{14}$ | ○ |
| ⑭ | 4.0 | 6.6 | $10^{12}$–$10^{13}$ | ⊙ |
| ⑮ | 5.0 | 6.8 | $10^{12}$–$10^{13}$ | ⊙ |
| ⑯ | 10.0 | 7.8 | $10^{12}$–$10^{13}$ | ⊙ |
| ⑰ | 20.0 | 8.6 | $10^{13}$–$10^{14}$ | ○ |
| ⑱ | 30.0 | 9.7 | $10^{14}$–$10^{15}$ | Δ |
| ⑲ | 40.0 | 10.1 | $10^{14}$–$10^{15}$ | Δ |
| ⑳ | 50.0 | 11.5 | $10^{15}$–$10^{16}$ | X |

Table 6 suggests that in the case the concentration of the hydrotalcite-type compound A is a low (0.0001 wt % or less) the coating film becomes insulator because surface resistivity becomes higher, whereas in the case the concentration of the hydrotalcite-type compound A is 0.001–20 wt % the coating film can obtain the effect to prevent from dirtiness because the surface thereof becomes semiconductor of the order of $10^{13}$ Ω cm or less in resistivity. In latter case, when the surface of the coating film is directed to lower side after fine particles of carbon are applied on the surface, most of the carbon particles are separated from the surface so that the surface of coating doesn't become dirt.

As shown in Table 6, the surface electric resistivity is nearly $10^{12}$ Ω cm and the resistances to the surface pollution or contamination are excellent in samples (4) through (10), composition rates of the hydrotalcite-type compound A in which are 0.005–0.1 wt %. The stabilities of coating solutions are good, the coating solutions can be easily applied on the substrate, and uniform thickness profiles of coating films are obtained in samples (1) through (10). The coating liquids become gelled unless diluting by organic solvents is immediately done after addition of the hydrotalcite-type compound A.

Next, the stock solution K was diluted by ethyl alcohol so that the percentage of the stock solution K becomes 5 wt % and then, stirred for 2 or 3 hours, furthermore added the dispersing agent, for example silane coupling agent, of 1~5 wt % in order to prepare a solution L. The solution L was applied on the substrate abovementioned and the coating films were formed. The electric resistivity of the surface of the coating films was measured. The results are shown in Table 7.

TABLE 7

Solution L

| | Solution K | | Surface | |
|---|---|---|---|---|
| | Hydrotalcite (wt %) | concentration in solution L (wt %) | resistivity (Ωcm) | Resistance to pollution |
| ① | 0.0001 | 0.01 | $10^{15}$ | X |
| ② | 0.0001 | 0.1 | $10^{14}$–$10^{15}$ | X |
| ③ | 0.0001 | 1.0 | $10^{14}$–$10^{15}$ | X |
| ④ | 0.0001 | 5.0 | $10^{14}$–$10^{15}$ | X |
| ⑤ | 0.0001 | 60.0 | $10^{14}$ | Δ |
| ⑥ | 0.0001 | 90.0 | $10^{14}$ | Δ |
| ① | 0.001 | 0.01 | $10^{14}$–$10^{15}$ | X |
| ② | 0.001 | 0.1 | $10^{14}$ | Δ |
| ③ | 0.001 | 1.0 | $10^{14}$ | Δ |
| ④ | 0.001 | 5.0 | $10^{13}$ | ⊙ |
| ⑤ | 0.001 | 60.0 | $10^{13}$ | ⊙ |
| ⑥ | 0.001 | 90.0 | $10^{13}$ | ⊙ |
| ① | 0.004 | 0.01 | $10^{14}$ | Δ |
| ② | 0.004 | 0.1 | $10^{14}$ | Δ |
| ③ | 0.004 | 1.0 | $10^{14}$ | Δ |
| ④ | 0.004 | 5.0 | $10^{12}$–$10^{13}$ | ⊙ |
| ⑤ | 0.004 | 60.0 | $10^{13}$ | ⊙ |
| ⑥ | 0.004 | 90.0 | $10^{13}$ | ⊙ |
| ① | 0.005 | 0.01 | $10^{13}$–$10^{14}$ | ○ |
| ② | 0.005 | 0.1 | $10^{13}$–$10^{14}$ | ○ |
| ③ | 0.005 | 1.0 | $10^{13}$–$10^{14}$ | ○ |
| ④ | 0.005 | 5.0 | $10^{13}$ | ⊙ |
| ⑤ | 0.005 | 60.0 | $10^{13}$ | ⊙ |
| ⑥ | 0.005 | 90.0 | $10^{13}$ | ⊙ |
| ① | 0.007 | 0.01 | $10^{13}$–$10^{14}$ | ○ |
| ② | 0.007 | 0.1 | $10^{13}$–$10^{14}$ | ○ |
| ③ | 0.007 | 1.0 | $10^{13}$–$10^{14}$ | ○ |
| ④ | 0.007 | 5.0 | $10^{13}$ | ⊙ |
| ⑤ | 0.007 | 60.0 | $10^{13}$ | ⊙ |
| ⑥ | 0.007 | 90.0 | $10^{12}$ | ⊙ |
| ① | 0.01 | 0.01 | $10^{14}$ | Δ |
| ② | 0.01 | 0.1 | $10^{14}$ | Δ |
| ③ | 0.01 | 1.0 | $10^{13}$ | ⊙ |
| ④ | 0.01 | 5.0 | $10^{12}$ | ⊙ |
| ⑤ | 0.01 | 60.0 | $10^{12}$ | ⊙ |
| ⑥ | 0.01 | 90.0 | $10^{11}$–$10^{12}$ | ⊙ |
| ① | 0.03 | 0.01 | $10^{14}$ | Δ |
| ② | 0.03 | 0.1 | $10^{13}$–$10^{14}$ | ○ |
| ③ | 0.03 | 1.0 | $10^{13}$ | ⊙ |
| ④ | 0.03 | 5.0 | $10^{13}$ | ⊙ |
| ⑤ | 0.03 | 60.0 | $10^{13}$ | ⊙ |
| ⑥ | 0.03 | 90.0 | $10^{13}$ | ⊙ |
| ① | 0.05 | 0.01 | $10^{14}$ | Δ |
| ② | 0.05 | 0.1 | $10^{14}$ | Δ |
| ③ | 0.05 | 1.0 | $10^{13}$–$10^{14}$ | ○ |
| ④ | 0.05 | 5.0 | $10^{13}$ | ⊙ |
| ⑤ | 0.05 | 60.0 | $10^{13}$ | ⊙ |
| ⑥ | 0.05 | 90.0 | $10^{13}$ | ⊙ |
| ① | 0.08 | 0.01 | $10^{13}$–$10^{14}$ | ○ |
| ② | 0.08 | 0.1 | $10^{13}$–$10^{14}$ | ○ |
| ③ | 0.08 | 1.0 | $10^{13}$–$10^{14}$ | ○ |
| ④ | 0.08 | 5.0 | $10^{12}$ | ⊙ |
| ⑤ | 0.08 | 60.0 | $10^{11}$–$10^{12}$ | ⊙ |
| ⑥ | 0.08 | 90.0 | $10^{11}$–$10^{12}$ | ⊙ |
| ① | 0.1 | 0.01 | $10^{13}$–$10^{14}$ | ○ |
| ② | 0.1 | 0.1 | $10^{13}$–$10^{14}$ | ○ |
| ③ | 0.1 | 1.0 | $10^{13}$–$10^{14}$ | ○ |
| ④ | 0.1 | 5.0 | $10^{13}$–$10^{14}$ | ○ |
| ⑤ | 0.1 | 60.0 | $10^{12}$–$10^{13}$ | ⊙ |
| ⑥ | 0.1 | 90.0 | $10^{12}$ | ⊙ |
| ① | 5.0 | 0.01 | $10^{13}$–$10^{14}$ | ○ |
| ② | 5.0 | 0.1 | $10^{13}$–$10^{14}$ | ○ |
| ③ | 5.0 | 1.0 | $10^{12}$ | ⊙ |
| ④ | 5.0 | 5.0 | $10^{12}$ | ⊙ |
| ⑤ | 5.0 | 60.0 | $10^{12}$ | ⊙ |
| ⑥ | 5.0 | 90.0 | $10^{12}$ | ⊙ |

Electric resistivity of the surface of the coating films formed by using the solution L, which are made by diluting the solution K, was increased. However, in the case that the solution L including the solution K, concentration of the hydrotalcite-type compound in which is 0.01 wt % or higher, is used, the coating films have the preferable properties of semiconductor.

The solution can be prepared by mixing any kind of transition metal oxide particles with hydrotalcite-type compounds and binder under acidic conditions, and using these solutions the coating films having the excellent resistance to pollution or contamination abovementioned can be formed.

The above embodiments or examples suggest that mixing transition metal oxide particles, surface resistivity of the coating film can be value of semiconductor region and then, surface of the coating film can obtain the resistance to adhesion of dust.

Resistance to adhesion of dust, which is enable to prevent from surface pollution of all sorts of members, particularly guardrails, road signs, signboards, etc., which are set at the side of heavy traffic roads, are proved to be obtained in the coating films formed by means of the solution including transition metal oxide particles shown in the above embodiments.

Film-forming composition (solution) of the above embodiments may be prepared as a product and also used as a ingredient of several paints, which are for example, organic paints including silicone resin, acryl resin, fluoroplastic, epoxy resin, melamine resin, urethane resin, phthalic resin, phenolic resin, nylon (polyamide resin), synthetic rubber, vinyl resin, isocyanate compounds, etc., and hydrotalcite-type compounds and transition metal oxide particles may be included into all sorts of thermosetting resin or thermoplastics.

What is claimed is:

1. A film-forming composition comprising a liquid which contains a binder and a hydrotalcite-type compound represented by $[M^{2+}_{1-x}M^{3+}_{x}(OH)_2]^{x+}[A^{n-}_{x/n}mH_2O]^{x-}$, where $M^{2+}$ is a bivalent metal ion, $M^{3+}$ is a trivalent metal ion, $A^{n-}$ is an anion of valency n and $0<x\leq0.33$, wherein said binder is colloidal silica.

2. A film-forming composition according to claim 1, characterized by containing transition metal oxide particles.

3. A film-forming composition according to claim 2, characterized by containing titanium oxide particles as said transition metal oxide particles.

4. A film-forming composition according to claim 1, characterized by a mean particle size of about 3–500 μm for said hydrotalcite-type compound and by further containing fine particles of a stable inorganic compound with a mean particle size of 1 μm or smaller.

5. A film-forming composition comprising a liquid which contains a binder and a hydrotalcite-type compound represented by $[M^{2+}_{1-x}M^{3+}_{x}(OH)_2]^{x+}[A^{n-}_{x/n}mH_2O]^{x-}$, where $M^{2+}$ is a bivalent metal ion, $M^{3+}$ is a trivalent metal ion, $A^{n-}$ is an anion of valency n and $0<x\leq0.33$, wherein a mean particle size of about 3–500 μm for said hydrotalcite-type compound and by further containing fine particles of a stable inorganic compound with a mean particle size of 1 μm or smaller.

6. A film-forming composition according to claim 5, characterized in that said inorganic compound is a transition metal oxide.

7. A film-forming composition according to claim 6, characterized in that at least part of said transition metal oxide is titanium oxide.

8. A film-forming composition according to claims 1, 2, 3, 4, 5, 6, or 7, characterized in that said hydrotalcite-type compound contains $Mg^{2+}$ as $M^{2+}$, $Al^{3+}$ as $M^{3+}$ and $CO_3^{3-}$ as $A^{n-}$.

9. A process for production of a film-forming composition characterized in; that a hydrotalcite-type compound represented by $[M^{2+}_{1-x}M^{3+}_{x}(OH)_2]^{x+}[A^{n-}_{x/n}mH_2O]^{x-}$, $M^{2+}$ is a bivalent metal ion, $M^{3+}$ is a trivalent metal ion, $A^{n-}$ is an anion of valency n and $0<x\leq0.33$, is dispersed in an aqueous liquid under acidic conditions and then a binder is added or said compound is dispersed in an aqueous liquid with a binder under acidic conditions.

10. A process for production of a film-forming composition according to claim 9, characterized in that transition metal oxide particles are added to an aqueous liquid containing said hydrotalcite-type compound under acidic conditions before the binder is added, or transition metal oxide particles are added to an aqueous liquid containing said hydrotalcite-type compound and the binder under acidic conditions.

11. A process for production of a film-forming composition according to claim 9 or 10, characterized in that the aqueous liquid containing the hydrotalcite-type compound, the binder and optionally the transition metal particles is diluted with water and/or an alcohol.

* * * * *